United States Patent [19]
Harrington et al.

[11] 4,269,251
[45] May 26, 1981

[54] TIRE AND WHEEL ASSEMBLIES
[75] Inventors: Wilfred H. Harrington, Solihull; William L. Jackson, Sutton Coldfield, both of England
[73] Assignee: Dunlop Limited, England
[21] Appl. No.: 56,263
[22] Filed: Jul. 10, 1979
[30] Foreign Application Priority Data

Jul. 29, 1978 [GB] United Kingdom ............ 31657/78

[51] Int. Cl.³ .................. B60C 7/24; B60C 15/00
[52] U.S. Cl. ..................... 152/362 R; 152/379.5
[58] Field of Search ...... 152/362 R, 362 CS, 330 RF, 152/379.1, 379.2 D, 379.2 R, 381.1, 381.2

[56] References Cited
U.S. PATENT DOCUMENTS 4,148,348  4/1978  French et al. .................. 152/379.1

FOREIGN PATENT DOCUMENTS 2714646  10/1977  Fed. Rep. of Germany ........ 152/379.1

Primary Examiner—Michael W. Ball
Attorney, Agent, or Firm—Stevens, Davis, Miller & Mosher

[57] ABSTRACT

A tire and wheel rim assembly wherein a bead includes a bead reinforcement (12) and a sector of elastomeric material extending for at least 60° around the reinforcement (12) in a direction axially inwards from the vertical plane through the reinforcement the sector being such that bead rotation generates substantial radial force to retain the bead. The sector may be of increasing radius or resistance to compression around the angle of the sector.

19 Claims, 2 Drawing Figures

TIRE AND WHEEL ASSEMBLIES

This invention relates to tire and wheel rim assemblies in particular to tubeless pneumatic tire and wheel rim assemblies.

In conventional pneumatic tire and wheel rim assemblies the tire beads are retained on their respective bead seats by means of the internal air pressure.

Deflation of the tire, however, leaves the assembly in a relatively unsafe condition in which the tire beads may be moved from their respective bead seats by sideways force. Such a condition affects control of the vehicle and in the case of the commonest types of wheel rim having a well to allow tire fitting, there is grave danger of complete separation of the tire from its wheel rim.

Bead spacer rings and similar devices have been proposed to deal with this problem. However, they suffer from the disadvantage that assembly is made more complicated by the need to insert these devices into position after at least one of the beads has been seated on the rim.

In U.K. Pat. No. 890,959 a split rim is proposed in which the split is sealed by clamping therein a fabric reinforced rubber covered extension of the tire bead. The assembly of this arrangement is also a complicated operation since the seal of the whole assembly in the normal inflated state depends upon the accurate clamping of the bead extension in the split. The clamped bead is also restrained from the movements which take place on deflection or distortion of the tire during normal running and this will lead to additional stresses in the bead region.

We have found that cornering generates sideways forces at the tread contact patch which displaces the tread laterally with respect to the wheel rim. These forces are transmitted by the tire carcass to the tire bead where both axial forces i.e. in the direction of the tire axis and turning moments about a circumferential line through the bead are generated. The rotational force or turning moment produces lifting of the heel of the bead about the bead toe, thus breaking any adhesive force between the bead and the rim which in the absence of air pressure in the tire are the only forces which retain the bead in place on its seat. As a result the bead moves down the tapered bead seat laterally inwardly of the rim flange reducing the tension in the bead wire, and very rapidly the bead retaining forces become less than the dislodging forces and the bead leaves its seat and falls into the well.

From separate static investigations we have found that in using a bead breaker tool to remove a tire from a tire rim there is substantially no turning movement applied to the bead of the tire and thus the action at the bead is different to that of road generated forces. The removal force produced by a bead breaker tool is, in fact, almost entirely an axial force which, when sufficient to overcome the combination of the adhesive force between the bead and the rim seat and the frictional force due to bead wire tension, causes the bead to move axially from the bead seat into the well of the rim.

According to one aspect of the present invention in a tire and wheel rim assembly, the wheel rim comprises a pair of bead seats, one at either side of the rim and the tire comprises a pair of beads each containing a substantially inextensible circumferentially extending bead reinforcement and at least one of the beads having a sector of elastomeric material extending in the cross-section of the tire for at least 60° around the reinforcement in a direction axially inwards of the bead from the radial plane containing the axis of the reinforcement, the sector being such that when part of the bead is subjected to a turning moment a substantial radial force is generated between the rim and the bead reinforcement acting outwards on the bead reinforcement and inwards on the rim but no substantial radial force when the bead is subjected only to an axial bead displacement force. More preferably the sector extends for at least 90° around the reinforcement but not more than 120°.

The sector may be constructed or formed so that it has a generally constant radius from the axis of the bead wire and has an increasing resistance to compression through the angle of the sector. This may be achieved, for example, by means of a progressively increasing hardness of material around the angle of the sector.

More preferably the sector has a progressively increasing radius through the said angle so that as the bead is rotated a greater thickness of the sector is between the reinforcement and the bead seat so that it acts as a cam to generate the radial force. Preferably the material of the sector is a hard material, for example greater than 60° Shore hardness more preferably 70°–96° Shore and it may be reinforced by any reinforcement material known in the art to give an effective stiffness of this order. Furthermore, the increasing radius may be combined with increasing resistance to compression through the angle of the segment.

The sector may be applied to one or both beads of the tire. Preferably, however, it is applied at least to the outboard bead.

It is preferred to provide in addition friction increasing means between the surface of the bead seat and the contacting surface of the bead to ensure rotation without relative slippage. The friction increasing means may be, for example, a pattern on the bead surface of the toe, chemical treatment of the surface of the bead or wheel rim, knurling or other mechanically formed grooving on the bead seat of the wheel rim, teeth raised in the metal of the wheel rim or other similar means. In each case, however, there are only shallow formation on the bead and/or rim.

According to another aspect of the invention, a pneumatic tire comprises a pair of beads each containing a substantially inextensible circumferentially extending bead reinforcement and at least one of the beads having a sector of elastomeric material extending for at least 60° around the reinforcement in a direction axially inwards of the bead from the radial plane containing the axis of the reinforcement wherein the sector has a generally constant radius from the axis of the bead wire and an increasing resistance to compression through the said 60° angle.

According to another aspect of the invention, a pneumatic tire comprises a pair of beads each containing a substantially inextensible circumferentially extending bead reinforcement and at least one of the beads having a sector of elastomeric material extending for at least 60° or more preferably 90° around the reinforcement in a direction axially inwards of the bead from the radial plane containing the axis of the reinforcement wherein the sector has a progressively increasing radius through the said angle.

The tire is preferably a tubeless tire and a radial tire although it may be a crossply tire, a belted bias tire or a semi radial tire.

Yet another aspect of the present invention provides a wheel rim adapted to provide increased frictional grip to a tire bead according to the requirements of the present invention. The wheel rim may for example have in the bead seat area upon which the tire bead is rotated, knurling shallow circumferential grooves or cuts, raised teeth facing outwardly towards the wheel rim flange or other similar configurations.

The wheel rim may have conventional tapered bead seats, reverse tapered bead seats or flat bead seats and may include a flat ledge.

It may be a split rim or more preferably be a conventional well-base rim. The use of a conventional wheel allows the use of a single piece wheel rim which provides great commercial advantage as it avoids the more costly assembly of split wheel rims.

In use of the present invention with a deflated tire lateral force applied at the tire tread under steering of a vehicle causes rotation of the bead and an increase in bead wire tension which results in retention of the bead in place on the wheel rim.

The invention is particularly useful with tires designed for safe use in a deflated condition in which case it is preferred that the tire is radial and has a tread wider than the width of the wheel rim between flanges (the width between flanges being the distance between the axially outermost points of the rim flanges which contact the tire when loaded in the deflated condition). Such tires preferably have an aspect ratio of between 30% and 75% and particularly between 55% and 70%.

It will be appreciated that this invention may be used with advantage with tires and rims of conventional dimensions and constructions.

One embodiment of the present invention will now be described, by way of example only, in conjunction with the attached diagrammatic drawings in which.

Figure 1:
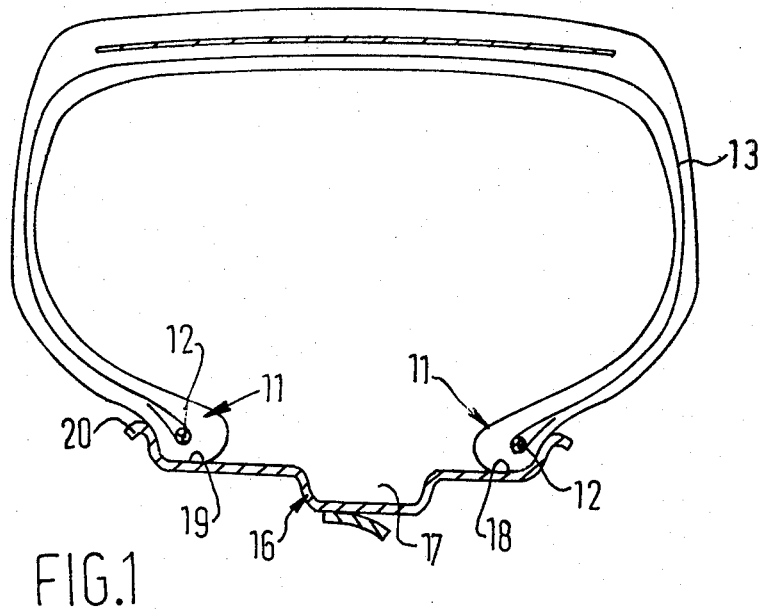
FIG. 1 is a cross-section of a tire and rim assembly according to the present invention.

The tire and wheel rim assembly shown in FIG. 1 is a 155/65 - 310 run-flat tire having a tread wider than the rim width. The tire carcass is a radial structure having a breaker assembly and a pair of conventional bead wire assemblies 12.

Figure 2:
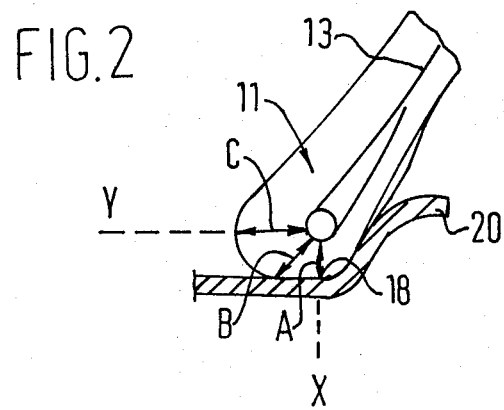
FIG. 2 is an enlarged view of the bead locking construction of FIG. 1.

The bead locking construction comprises a tire bead 11 including the bead wire 12 and main carcass reinforcement 13. The bead region of the tire is formed such that the thickness of material between the bead wire and the outer bead portion contacting the surface of the rim baad seat is moulded such that is increases i.e. dimensions A, B and C as shown in FIG. 2 progressively increase. Thus the radius of the material in the sector of 90° from X to Y increases progressively, A and C being at 90°.

The one piece wheel rim 16 has a center well 17 to allow tire fitting and inboard and outboard bead seats 18 and 19 each terminating in a conventional rim flange 20. The bead seats 18 and 19 are lightly knurled to provide effective frictional grip to the tire bead 11.

Thus when the tire is subjected to lateral forces at the tread and the bead region 11 is rotated about the bead wire 12, a progressively increasing thickness of rubber is forced between the bead 12 and the bead seat 18. The resultant "camming" action produces increasing force in the radially outwardly direction. This increasing force increases the tensile force in the bead wire and this results in increasing the compression in the material between the bead wire 12 and the bead seat 18 around the complete circumference of the tire. The increased compression forces increase the retention force between the material of the bead and the bead seat 18. Thus rotation of the bead about an instantaneous center is used to produce force to retain the bead on its seat. The seat is made sufficiently wide so that sufficient rotation of the bead may occur before any localized section of the bead may reach a well provided in the wheel rim.

It is preferred that the material in the regions of the bead where dimensions A, B and C are marked, is of harder material than conventional bead seats in order to maximize the generation of radially outward bead locking forces.

In an alternative embodiment the radius of the sector may be substantially constant but the hardness of the material is progressively increased through the angle of the sector. Thus once again an increasing bead locking or retaining force is generated with rotation.

Having now described our invention what we claim is:

1. A tire and wheel rim assembly, the wheel rim comprising a pair of bead seats, one at either side of the rim and the tire comprising a pair of beads each containing a substantially inextensible, circumferentially extending bead reinforcement and at least one of the beads having a sector of elastomeric material extending for at least 60° around the reinforcement in a direction axially inwards of the bead from the radial plane containing the axis of the reinforcement, the sector having a construction which, when part of the bead is subjected to a turning moment inward of the rim, generates a substantial radial force between the rim and the bead reinforcement acting outwards on the bead reinforcement and inwards on the rim, but which, when the bead is subjected only to an axial bead displacement force, generates no substantial radial force, said substantial radial force increasing with increasing turning moment of said bead part and serving to retain said at least one bead in place on said rim.

2. A tire and wheel rim assembly according to claim 1 wherein the sector extends for at least 90° but not more than 120° around the reinforcement.

3. A tire and wheel rim assembly according to claim 1 wherein the sector is of substantially constant radius from the axis of the bead wire and has an increasing resistance to compression through the angle of the sector.

4. A tire and wheel rim assembly according to claim 3 wherein the increasing resistance to compression is provided by means of the elastomeric material of the sector being of increasing hardness around the sector.

5. A tire and wheel rim assembly according to claim 1 wherein the sector has a progressively increasing radius around the angle of the sector.

6. A tire and wheel rim assembly according to claim 5 wherein the elastomeric material of the sector has a hardness of greater than 50° Shore.

7. A tire and wheel rim assembly accordig to claim 6 wherein the hardness of the elastomeric material is in the range of 70°-96° Shore.

8. A tire and wheel rim assembly according to claim 1 wherein the elastomeric material of the sector includes a reinforcement material.

9. A tire and wheel rim assembly according to claim 1 wherein the resistance to compression of the material in the sector around the said angle of the sector increases.

10. A tire and wheel rim assembly according to claim 9 wherein the increasing resistance to compression is provided by means of the elastomeric material of the sector being of increasing hardness around the sector.

11. A tire and wheel rim assembly according to claim 1 wherein a sector is provided in both tire beads.

12. A tire and wheel rim assembly according to claim 1 wherein friction increasing means are provided between the bead seat and the tire bead to ensure rotation of the bead.

13. A tire and wheel rim assembly according to claim 12 wherein the friction increasing means comprises a tread pattern on a bead surface of the toe.

14. A tire and wheel rim assembly according to claim 12 wherein the friction increasing means comprises grooves in the bead seat of the wheel rim.

15. A tire and wheel rim assembly according to claim 14 wherein the grooves are formed by knurling.

16. A tire according to claim 1 wherein the tire is a radial tire.

17. A pneumatic tire comprising a pair of beads each containing a substantially inextensible, circumferentially extending bead reinforcement and at least one of the beads having a sector of elastomeric material extending for at least 60° around the reinforcement in a direction axially inwards of the bead from the radial plane containing the axis of the reinforcement wherein the sector has a generally constant radius from the axis of the bead wire and an increasing resistance to compression through the said 60° angle such that when said tire is mounted on a rim and the bead is subject to an increasing turning moment inward of the rim a substantial increasing radial force is generated between the rim and bead reinforcement, which serves to retain said at least one bead in place on the rim.

18. A pneumatic tire comprising a pair of beads each containing a substantially inextensible, circumferentially extending bead reinforcement and at least one of the beads having a sector of elastomeric material extending for at least 60° around the reinforcement in a direction axially inwards of the bead from the radial plane containing the axis of the reinforcement wherein the sector has a progressively increasing radius through the said angle such that when said tire is mounted on a rim and the bead is subject to an increasing turning moment inward of the rim a substantial increasing radial force is generated between the rim and bead reinfocement, which serves to retain said at least one bead in place on the rim.

19. A pneumatic tire as in claim 17 wherein said sector extends at least 90° around said reinforcement.

* * * * *